United States Patent
Nabeiro et al.

(10) Patent No.: US 11,627,830 B2
(45) Date of Patent: Apr. 18, 2023

(54) BEVERAGE DISTRIBUTION SYSTEM WITH OPTIMIZED RETENTION OF BEVERAGE RECIPIENTS

(71) Applicant: NOVADELTA—COMÉRCIO E INDÚSTRIA DE CAFÉS S.A., Lisbon (PT)

(72) Inventors: Rui Miguel Nabeiro, Campo Maior (PT); Jesús Medina Mundt, Lisbon (PT); Marco Filipe Gonçalves Martins, Pedreiras (PT); José Miguel De Jesus Estima, Lisbon (PT)

(73) Assignee: NOVADELTA—COMÉRCIO E INDÚSTRIA DE CAFÉS S.A., Lisbon (PT)

( * ) Notice: Subject to any disclaimer, the term of this patent is extended or adjusted under 35 U.S.C. 154(b) by 588 days.

(21) Appl. No.: 16/605,891

(22) PCT Filed: Apr. 16, 2018

(86) PCT No.: PCT/PT2018/050015
§ 371 (c)(1),
(2) Date: Oct. 17, 2019

(87) PCT Pub. No.: WO2018/194476
PCT Pub. Date: Oct. 25, 2018

(65) Prior Publication Data
US 2021/0121001 A1    Apr. 29, 2021

(30) Foreign Application Priority Data
Apr. 18, 2017 (PT) .......................... 110032

(51) Int. Cl.
*A47J 31/44* (2006.01)
*A47J 31/46* (2006.01)
(Continued)

(52) U.S. Cl.
CPC ....... *A47J 31/4425* (2013.01); *A47J 31/3623* (2013.01); *A47J 31/3676* (2013.01);
(Continued)

(58) Field of Classification Search
CPC .... A47J 31/4425; A47J 31/36; A47J 31/3604; A47J 31/3619; A47J 31/3623;
(Continued)

(56) References Cited

U.S. PATENT DOCUMENTS

| 6,196,282 B1* | 3/2001 | Mollers | B65B 39/004 |
| | | | 141/113 |
| 9,974,412 B2* | 5/2018 | Kollep | A23F 5/262 |
| 2009/0165891 A1* | 7/2009 | Candelise | B60K 15/04 |
| | | | 141/346 |

FOREIGN PATENT DOCUMENTS

| DE | 10 2008 050 532 A1 | 4/2010 |
| DE | 10 2009 048 233 A1 | 4/2010 |

(Continued)

OTHER PUBLICATIONS

Written Opinion for PCT/PT2018/050015, dated Jul. 13, 2018.
International Search Report for PCT/PT2018/050015, dated Jul. 13, 2018.

*Primary Examiner* — Reginald Alexander
(74) *Attorney, Agent, or Firm* — Sughrue Mion, PLLC

(57) ABSTRACT

A system for distribution of beverages, such as espresso coffee and similar aromatic beverages, comprising at least one type of beverage recipient (1, 1'), such as a glass, cup or similar, and a beverage discharge disposition (2) operatively associated with a beverage preparation device (3). The beverage discharge disposition (2) is provided so that the beverage discharge flow impinges, with a given flow pressure, a flow regulation disposition (12) in the base region (11) of beverage recipient (1, 1') along a direction opposite to the gravity force. The beverage discharge disposition (2)
(Continued)

presents at least two engagement elements (23) arranged in common perimeter alignment and symmetric distribution around said beverage discharge element (21) and provided so that can be moved radially, outwards or inwards, between the open (I) and retention position (II), and vice-versa, by actuation means (25; 251, 252) arranged in centred and symmetric manner with relation to the beverage discharge element (21).

15 Claims, 6 Drawing Sheets

(51) Int. Cl.
*A47J 31/52* (2006.01)
*A47J 31/36* (2006.01)

(52) U.S. Cl.
CPC ........... *A47J 31/461* (2018.08); *A47J 31/468* (2018.08); *A47J 31/525* (2018.08); *A47J 31/3633* (2013.01); *A47J 31/46* (2013.01)

(58) Field of Classification Search
CPC ................ A47J 31/3628; A47J 31/3633; A47J 31/3676; A47J 31/3695; A47J 31/46
USPC ................ 99/300, 302 P; 141/113, 346, 369
See application file for complete search history.

(56) References Cited

FOREIGN PATENT DOCUMENTS

| | | |
|---|---|---|
| DE | 10 2009 012 055 A1 | 9/2010 |
| EP | 2928347 A1 | 10/2015 |

* cited by examiner ered position and an upwards projected position, and that actuation of the injection means can be carried out by dedicated means or by increasing the pressure exerted upon the beverage discharge means by the pump of the device. Moreover, said device comprises support means of beverage receptacle designed so as to support and selectively retain the beverage receptacle. In particular, it is discloses an embodiment whereby said receptacle presents an engagement portion in the base part thereof, adapted so that can be engaged by mobile retention means, whereby said retention means are apparently provided in asymmetric manner, including a protruding annular portion that vertically engages in the base region of receptacle, and a metallic lash-like member disposed in the circumference of the annular protruding portion and configured in a hook-like form so that swivels around an axis orthogonal to the prevailing direction of flow discharge and engages in a step part of the receptacle.

BEVERAGE DISTRIBUTION SYSTEM WITH OPTIMIZED RETENTION OF BEVERAGE RECIPIENTS

This application is a National Stage of International Application No. PCT/PT2018/050015 filed Apr. 16, 2018, claiming priority based on Portuguese Patent Application No. 110032 filed Apr. 18, 2017.

FIELD OF THE INVENTION

The present invention refers to the field of beverage distribution systems, in particular systems for preparing espresso coffee and similar, presenting beverage discharge means to inside of a recipient along a direction that is substantially opposite to that of the gravity force.

BACKGROUND OF THE INVENTION

The prior art presents several solutions of beverage discharge in beverage preparation machines. In particular in the case of aromatic beverages such as for example espresso type coffee, this beverage discharge is a relevant process with potential impact in the quality of beverage obtained in the recipient. In fact, in particular in the case of espresso type coffee, the main characteristics of discharge flow determines several aspects such as the production of crème and the retention thereof inside of the cup, and the temperature variation as a result of exposure to air during the discharge down to a cup.

The documents EP 2120652 B1 and CH 702947 A2 disclose beverage preparation systems, including espresso type coffee, with beverage discharge along a direction opposite the gravity force. In these cases, it is necessary that an upstream discharge part can directly impinge on a one-way valve disposition in the recipient. In particular, the document EP 2120652 B1 discloses a beverage recipient that presents an engagement portion associated with the base wall and configured in shape of an inwards oriented step. Moreover, there is disclosed a beverage discharge that comprises a mobile element adapted so that can mechanically engage with said engagement portion so that retains said beverage recipient in a correct position when impinged in the base wall with the pressurized beverage flow.

The document WO 2013/041580 A1 also discloses a disposition of retention of beverage recipients by means of pressurized fitting with an engagement portion that develops in the base region of the recipients and is adapted so that can be retained by engagement elements provided in a placement surface.

The documents EP 2029470 B1 and WO 2011/106259 A1 disclose systems of discharge of liquids comprising a recipient that presents a base region adapted with an asymmetric configuration, so that can be retained in a discharge disposition that carries out the beverage discharge.

The documents DE 10 2009 048233 A1 and WO 2015/173127 A2 disclose beverage preparation systems whereby the flow flows in a direction opposite the gravity force inside of a brewing device that collects the edible substance precursor of beverage.

The document WO 2013/041580 A1 discloses a support disposition of beverage recipients, provided so that can collect recipients of different dimensions and retain these in removable manner in a filling position.

The document EP 2928347 B1 discloses a beverage preparation device of the type of the present invention. The document refers that the injection means can be moved vertically between a withdrawn position and an upwards

GENERAL DESCRIPTION OF THE INVENTION

The objective of the present invention is to provide a beverage distribution system including beverage recipients and a beverage discharge disposition that provides pressurized injection of the beverage discharge flow along a direction opposite to the gravity force direction, through a base region of said beverage recipients, and that is adapted so that provides better retention conditions of beverage recipients on said beverage discharge disposition, with a more ergonomic use and simpler and more reliable construction of the retention means of beverage recipients.

This objective is attained according to the present invention by means of a beverage preparation system according to claim 1, whereby preferred embodiments are described in the secondary claims.

In particular, the system according to the present invention comprises a beverage discharge disposition that presents at least two engagement elements arranged on a common alignment, around and in a symmetric distribution in relation to said beverage discharge element, and provided so that can be moved radially, outwards or inwards, between the open and the retention position, and vice-versa, by actuation means arranged in centred and radially symmetric manner with relation to said beverage discharge element.

It is preferred when said beverage discharge disposition is provided on a more elevated level than a brewing device, so that any rests of beverage discharge can be retained upstream of the beverage discharge disposition under the action of the gravity force, whereby said brewing device is provided inside or outside of the chassis of the beverage preparation apparatus.

It is preferred when said system comprises a plurality of types of beverage recipients presenting a general shape of glass, cup type or similar, with a beverage collection space developing upwards from a base wall, and presenting a passageway, a flow regulation disposition adapted so that only provides passageway to a pressurized flow, for example of one-way valve type or plurality of adjacent micro-holes, and an engagement portion associated with said base wall, developing downwards in relation hereto and adapted so that can be placed on said beverage discharge disposition and retained by engagement elements in a retention position where said flow regulation disposition is above and vertically aligned with said beverage discharge element.

It is preferred when said flow regulation disposition is adapted so that provides passageway to a beverage discharge flow only in one flow direction, for example of the type one-way valve or plurality of adjacent micro-holes, and only if impinged with a flow pressure bigger than 1.5 bar, particularly preferentially bigger than 10 bar.

It is preferred when said flow regulation disposition is provided as a one-way valve, and adapted so that can be retained by means of pressured fitting in the passageway opening in the base region of beverage recipient.

In particular, the system can include different types of beverage recipients presenting different dimensions, such as for example the volume of the collection space, diameter of the base regions, but adapted so that can be retained in a same type of beverage discharge disposition, in particular presenting at least one of: a second engagement part of similar dimensions and similar respective flow regulation disposition, whereby it is further preferred when at least one of said types of beverage recipients is not a disposable recipient.

It is preferred when said beverage discharge disposition is provided in a more elevated plane that a brewing device, so that any remains of discharged beverage can be retained upstream of the beverage discharge disposition by action of the gravity force, whereby said brewing device is provided inside or outside of the chassis of beverage preparation apparatus.

It is preferred when the system provides the preparation of at least one type of beverage, including at least a brewing device, for preparation of espresso type coffee and other aromatic beverages, adapted for collecting an individual portion of edible substance, optionally provided inside of a respective capsule.

DESCRIPTION OF THE FIGURES

The invention shall hereinafter be explained in greater detail based upon preferred embodiments and the attached Figures.

The Figures show, in simplified schematic representations.

DETAILED DESCRIPTION OF PREFERRED EMBODIMENTS OF THE INVENTION

Figure 1:
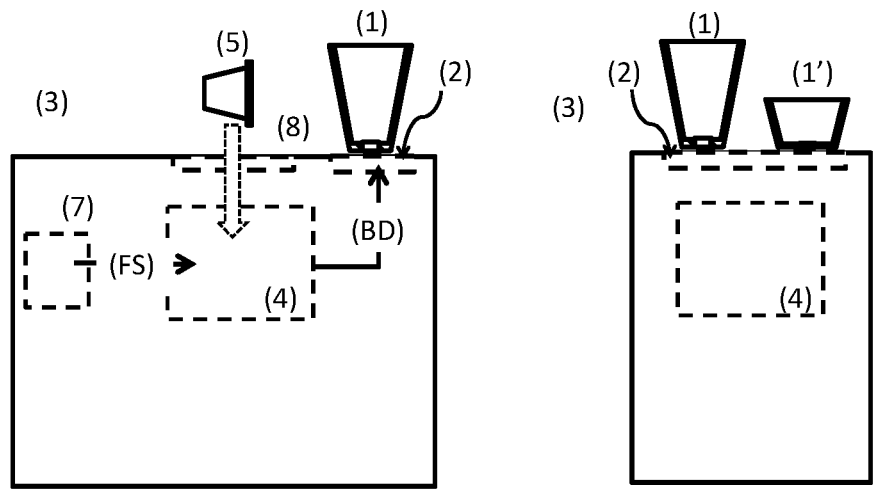
FIG. 1: side view (on the left-hand side) and respective front view (right-hand side) of a beverage distribution system of the type of the present invention.

FIG. 1 represents side view, on the left-hand side, and front view, on the right-hand side, of a beverage preparation system according to prior art.

Said system comprises at least one type of beverage recipient (1, 1'), such as for example a cup or a glass, that presents a base wall (11) comprising a flow passageway opening (110) and a flow regulation disposition (12), whereby said beverage recipient (1) is adapted so that can be retained in a beverage discharge disposition (2).

Said system comprises a beverage apparatus (3), for example in the form of machine for preparing espresso coffee and similar aromatic beverages, that presents at least one brewing device (4) provided as interior or exterior part of the casing of said apparatus (3), and so that can collect a portion (5) of edible substance precursor of beverage, for example contained in a capsule or similar.

Moreover, it is preferred when said beverage apparatus (3) includes a fluid reservoir (not represented), as well as a flow pressurization device (7) and a fluid heating device (not represented), so that can provide a flow supply (FS) at a temperature comprised between 60 and 100° C. and at a pressure comprised between 1 and 20 bar, preferentially more than 10 bar, so as to interact with said edible substance.

Said discharge flow (BD) is afterwards conducted from an exit of said brewing device (4) to a beverage discharge disposition (2) arranged downstream thereof and that includes at least one beverage discharge element (21) adapted for engaging, preferentially by means of pressured fitting, with the base region (11) of a beverage recipient (1, 1').

The system includes a plurality of types of beverage recipients (1, 1') presenting different dimensions, for example diameter, of respective base walls (11), but adapted so as to engage in a same type of beverage discharge disposition (2), whereby at least one of said types of beverage recipients (1, 1') is not a disposable recipient.

It is preferred when said beverage discharge disposition (2) is provided at a more elevated plane than said brewing device (4), so that any rests of beverage discharge can be retained upstream of, that is at a lower level than, the beverage discharge disposition (2) by action of the gravity force.

Figure 2:
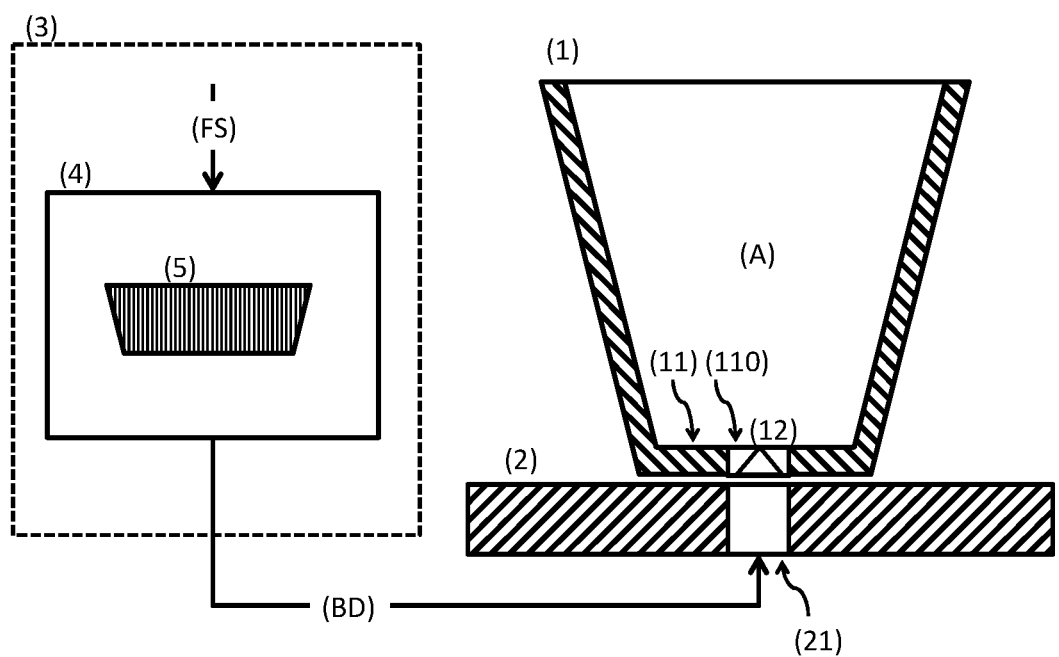
FIG. 2: side view of main components of a beverage preparation system according to prior art.

As represented in FIG. 2, said types of beverage recipients (1, 1') can present a flow regulation disposition (12), for example of the type one-way valve (symbolically represented by a triangle), provided retained in a flow passageway opening (110) of said base wall (11) and adapted so that provides passageway to a pressurized flow of beverage discharge (BD) downstream, to said collection space (A), along a direction opposite to the gravity force, if impinged with a flow pressure bigger than a previously defined value of pressure flow.

Figure 3:
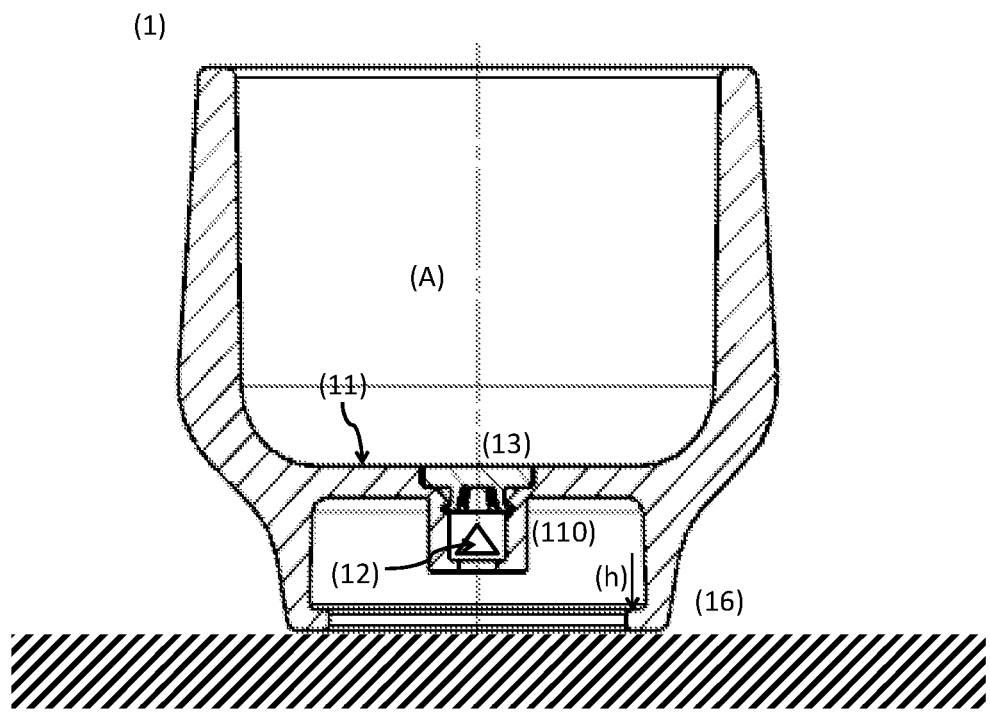
FIG. 3: side-cut view of a first embodiment of beverage recipient (1) of a beverage preparation system according to the present invention.
Figure 4:
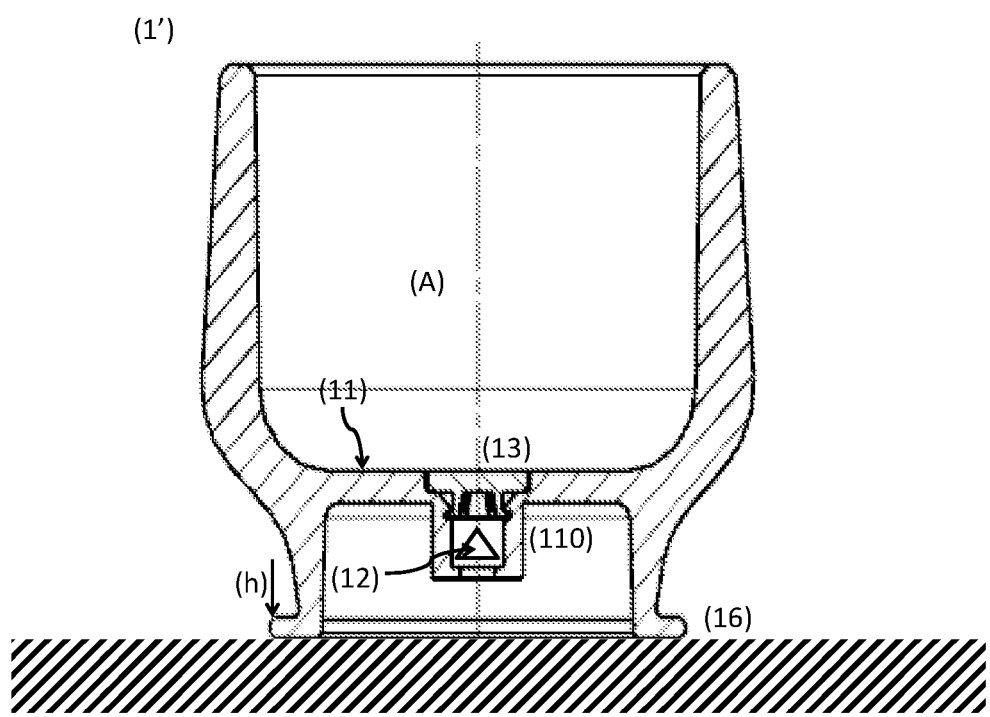
FIG. 4: side-cut view of a second embodiment of beverage recipient (1) of a beverage preparation system according to the present invention.

FIGS. 3 and 4 represent preferred embodiments of beverage recipients (1, 1') of the type cup, glass or similar, of a beverage preparation system according to the invention.

The beverage recipients (1, 1') comprise a base wall (11) that can present a flow passageway opening (110) where there is provided said flow regulation disposition (12), again symbolically represented by a triangle. It is preferred when said flow regulation disposition (12) is provided by a device of the type one-way valve, in particular a valve regulated by the upstream flow pressure, such as for example of the butterfly or umbrella type, presenting an elastic element that provides an opening of a respective flow passageway when impinged with a given pressure, and closure when not impinged therewith, in particular provided so that only enables flow passageway when the upstream flow pressure is bigger than 1.5 bar, preferentially bigger than 3 bar, particularly preferentially bigger than 8 bar.

Alternatively, the beverage recipient (1) can present a flow regulation disposition (12) in the form of a plurality of micro-holes dimensioned so that only provide flow passageway when impinged with a previously defined flow pressure bigger than the atmospheric pressure.

It is particularly preferred when the beverage recipients (1, 1') further comprise a flux constrain disposition (13) associated with said flow passageway opening (110), for example inside thereof, downstream of said flow regulation disposition (12), and adapted so that provides at least one of: at least one flow impact wall and at least one constrain of flow passage section, thereby reducing the flow velocity of beverage discharge (BD) until entering in said collection space (A).

The beverage discharge flow (BD) thereby flows to the interior of said collection space (A) at a more reduced velocity, preferentially by means of a space of reduced dimensions of gap type, or similar, that is provided as an opening that is co-planar with the remanding interior surface of the collection space (A), so that no flow admission holes are perceptible inside of said collection space (A).

Moreover, the beverage recipients (1, 1') present an engagement part (16) associated with said base region (11) and adapted so that can be retained on said beverage discharge disposition (2).

In FIG. 3, the engagement portion (16) presents a projection part that develops radially inwards, so that can be retained by the exterior perimeter on a respective beverage discharge disposition (2), while FIG. 4 shows a second embodiment of beverage recipient (1') whereby the projection part of the engagement part (16) extends radially outwards with relation to the central axis of beverage recipient (1'), so that can be retained by the exterior perimeter on a respective beverage discharge disposition (2).

The beverage preparation system according to the invention can include a plurality of different types of beverage recipients (1, 1') presenting different dimensions, such as for example volume of collection space (A), in particular different dimensions of respective base walls (11), for example diameter, but adapted so as to engage on a same type of beverage discharge disposition (2), in particular presenting a similar engagement height (h).

Figure 5:
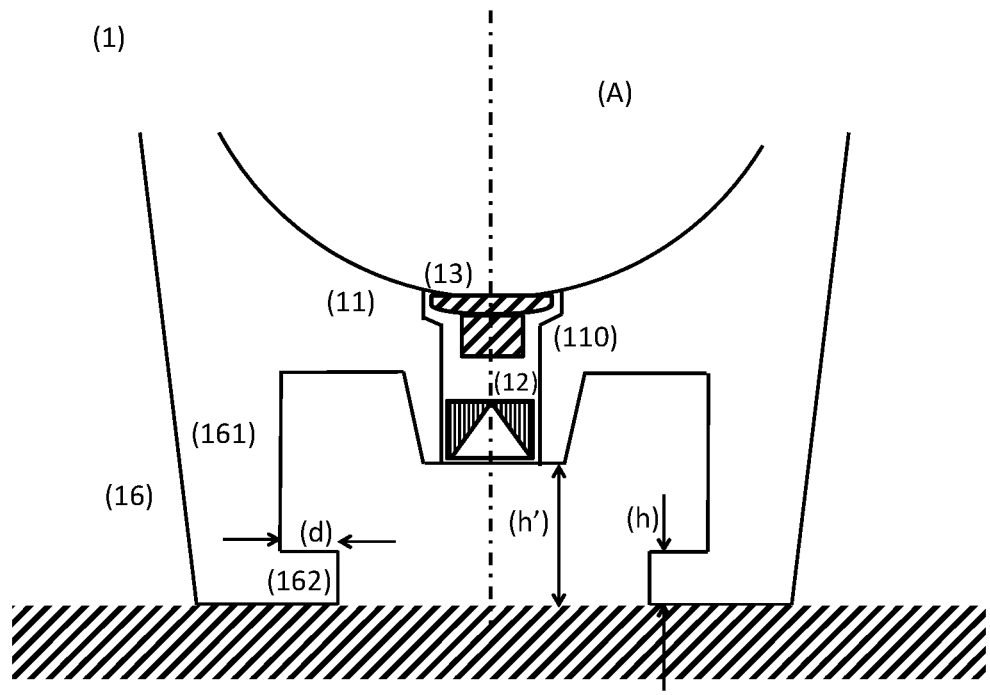
FIG. 5: side-cut view of detail of the base region (11) of a beverage recipient (1) in a beverage preparation system according to the present invention.
Figure 6:
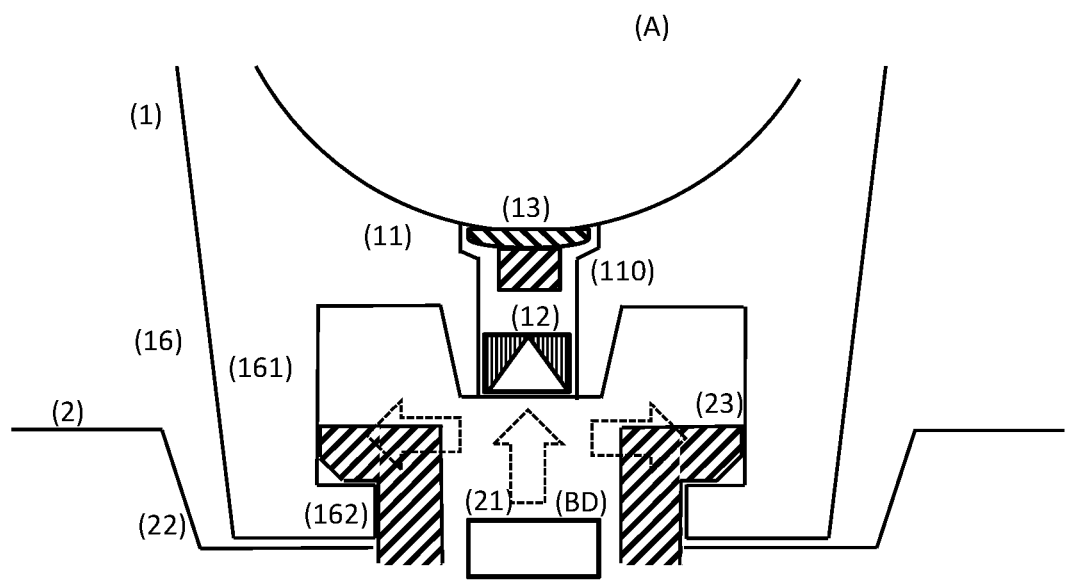
FIG. 6: side-cut view of detail of the base region (11) of beverage recipient (1) placed in a beverage discharge disposition (2) in a beverage preparation system according to the present invention.

FIGS. 5 and 6 represent details of the base wall (11) of a beverage recipient (1) and type of engagement on a beverage discharge disposition (2) in a system according to the present invention.

According to an inventive aspect, said beverage recipient (1, 1') presents an engagement portion (16) that projects from said base wall (11) and is adapted so that said beverage recipient (1, 1') can be placed on a placement surface (22) of said beverage discharge disposition (2), and that can be retained on said placement surface (22) by means of engagement elements (23) adapted so as to engage with said engagement portion (16), and actionable by actuation means (25; 251, 252) between an open position (A) and a closed position (B), where said beverage regulation disposition (12) is vertically aligned above said discharge means (21).

According to a preferred embodiment, said beverage recipient (1, 1') presents an engagement portion (16) that comprises a first part (161) that develops downwards, and a second part (162) that develops along a transversal direction with relation to the centre of beverage recipient (1, 1'), whereby said first and second parts (161, 162) are configured with a shape that provides shape engagement of engagement elements (23) associated with said beverage discharge disposition (2), in particular presenting an engagement depth (d) and an engagement height (h) bigger than 0.5 mm and smaller than 25 mm, e, preferentially, providing a free height (h'), preferentially bigger than said engagement height (h), in the interior region that they delimit above of said recipient placement surface (22).

It is preferred when the first part (161) of said engagement portion (16), develops aligned with the exterior surface of the beverage recipient, and the second part (162) of said engagement portion (16) develops inwards with relation to the collection space (A), so that results an interior step rim adapted for engagement with corresponding engagement elements (23) provided on said beverage discharge disposition (2).

It is preferred when said first and second parts (161, 162) present a total height comprised between 10 and 50 mm, preferentially between 15 and 45 mm, and confine an interior cavity with a free height (h') of at least 10 mm.

It is preferred when said second part (162) defines an interior diameter of at least 10 mm, preferentially comprised between 20 mm and 80 mm, particularly preferentially between 30 and 60 mm.

It is preferred when said second part (162) presents an engagement depth (d) along the direction transversal to the prevailing flow direction, comprised between 2 and 10 mm, preferentially between 4 and 8 mm.

As represented in FIG. 6, the beverage discharge disposition (2) presents a beverage discharge element (21) that includes at least one flow exit generally oriented upwards, a collection part (22) adapted for removable retention of the recipient (4) and a sealing element (not represented) of the o-ring type, or similar, whereby said beverage discharge element (21) is united with said brewing device (4) by means of a tube, preferentially of flexible type (not represented).

It is preferred when said beverage discharge disposition (2) presents a beverage discharge element (21) adapted for engaging, preferentially by means of pressured fitting, with a portion adapted in corresponding manner of the base portion (11) of beverage recipient, and when said beverage discharge disposition (2) presents a recipient placement surface (22) provided as a cavity presenting at least one lowered surface relative to the remaining top surface of beverage discharge disposition (2), preferentially in inclined manner towards the centre or the perimeter, and presenting at least one passageway for collection of residual fluid to an inferior level (not represented).

Figure 7:
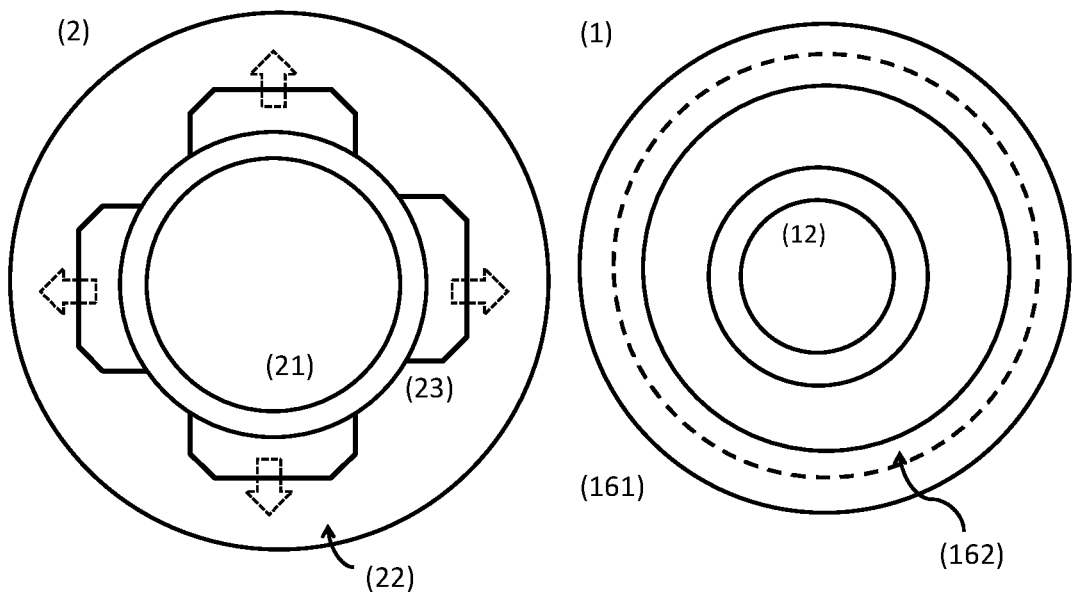
FIG. 7: superior top view of a beverage discharge disposition (2) and inferior view of the base region (11) of a beverage recipient (1) in a beverage preparation system according to the present invention.

As one can better observe in the top views of FIG. 7, said beverage discharge disposition (2) presents a plurality of engagement elements (23) provided along an exterior alignment and in symmetric manner with relation to the beverage discharge disposition (21), oriented radially outwards, in this case as saliences configured so that can engage by means of a connection of the type pressured fitting in corresponding fitting elements (162) provided in a cavity part of said base region (11), thereby retaining the recipient (1) in removable manner on said beverage discharge disposition (2).

As indicated by the arrows in FIGS. 6 and 7 on the left-hand side, said engagement elements (23) are adapted so that can be actuated, only along a translation movement, between an open position (I) where they enable the placement of a beverage recipient (1, 1') over said beverage discharge element (21), and a closed position (II) where they are moved radially outwards so as to engage with the engagement portion (16), so that the central region of the beverage recipients (1, 1') is retained in a position substantially aligned above of said beverage discharge element (21), thereby retaining the beverage recipient (1, 1') during the beverage discharge, and vice-versa, between the retention position (II) and the open position (I).

It is preferred when said engagement elements (23) are provided so that can be jointly actuated in radial movement outwards and inwards, only of translation, without rotation in relation to said beverage discharge element (21), whereby said radial translation movement is operatively associated with an ascending movement of said beverage discharge element (21) between a respective collected position and a projected position where is at least in the proximity of said flow regulation disposition (12), and vice-versa.

Figure 8:
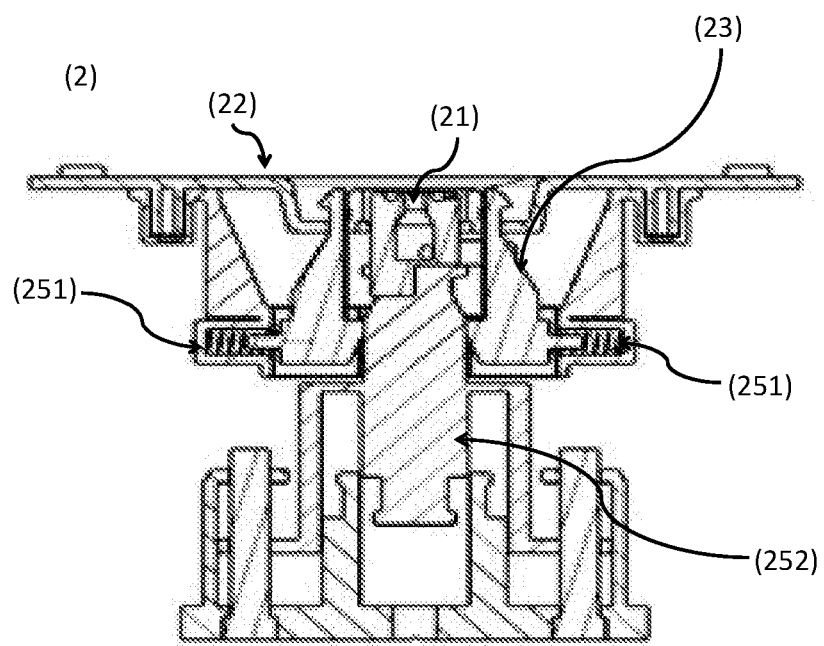
FIG. 8: side-cut view of a beverage discharge disposition (2) in a beverage preparation system according to the present invention.
Figure 9:
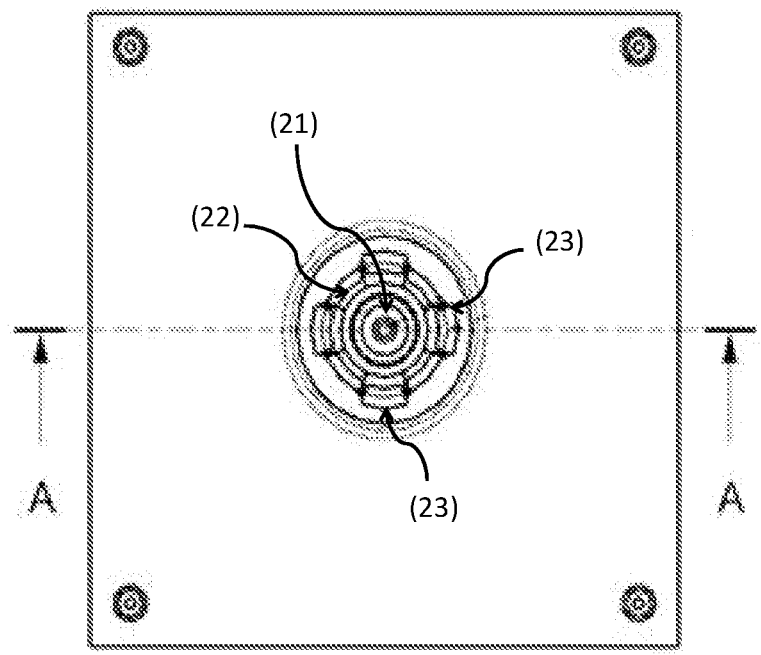
FIG. 9: superior top view of a beverage discharge disposition (2) in a beverage preparation system according to the present invention.

FIGS. 8 and 9 represent a preferred embodiment of a beverage discharge disposition (2) in a system according to the present invention.

According to an inventive aspect, said engagement portion (16) of beverage recipient (1) is adapted so that can be retained by engagement elements (23) provided so that can be radially moved between an open position (I) e and a retention position (II) where they engaged with said engagement portion (16) thereby retaining said beverage recipient (1, 1') on said recipient placement surface (22), and vice-versa, between the retention position (II) and the open position (I).

As represented, said beverage discharge disposition (2) comprises four engagement elements (23) that present an engagement part (231) configured in a hook type form, of inverted "L" type, or similar, that projects above the recipient placement surface (22) and is adapted so as to engage with said engagement portion (16) of beverage recipients (1, 1'), and first and second actuation parts (232, 233) adapted so that can be actuated by respective actuation means (251, 252) provided underneath the recipient placement surface (22).

Figure 10:
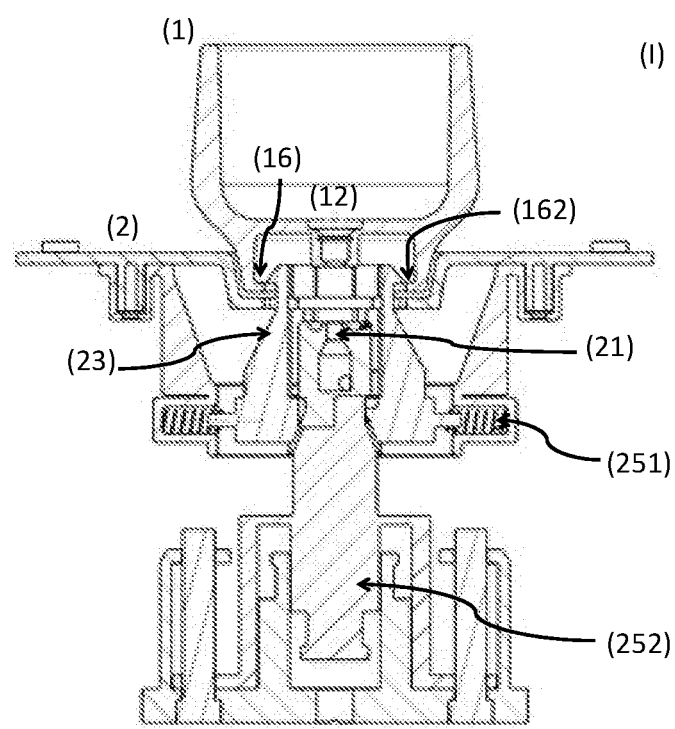
FIG. 10: side-cut view of an embodiment of beverage preparation system according to the invention, in an open position (I)
Figure 11:
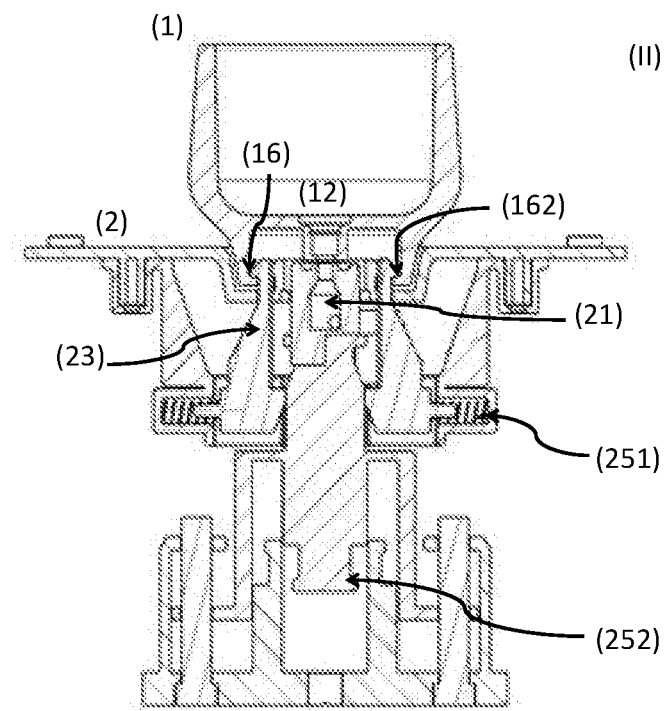
FIG. 11: side-cut view of an embodiment of a beverage preparation system according to the invention, in a closed position (II)

FIGS. 10 and 11 represent the embodiment according to FIGS. 8 and 9, in an open position (I) and in a retention position (II), respectively.

According to an inventive aspect, said beverage discharge disposition (2) comprises first actuation means (251) provided as elastic means and disposed so that impinge with an elastic force, radially inwards, said first actuation part (232) of each engagement element (23) to a corresponding open position (I), and second actuation means (252) adapted so that move vertically said beverage discharge element (21), so that when moving upwards pressure radially outwards said second actuation part (232) of said retention elements (23) against the action of said elastic means (251), so that the retention elements (23) move radially outwards and the respective engagement part (231) engages with said engagement portion (16) of beverage recipients (1, 1') in a retention position (II), and vice-versa, between a retention position (II) and an open position (I).

It is preferred when said beverage discharge disposition (2) is provided so that the actuation means (25; 251, 252) include at least one of elastic means and electro-mechanic means, preferentially hydraulic means.

It is preferred when said beverage discharge disposition (2) is controlled between the open (I) and retention positions (II) by means of a device controlling the operation of the beverage preparation apparatus (3), according to at least one of: a sensor of presence of beverage recipient (1, 1') on said beverage discharge disposition (2), and an actuation interface of beverage preparation apparatus (3).

It is preferred when said beverage apparatus (3) further comprises state presentation means (not represented) adapted so as to communicate to the user a correct placement of the beverage recipient (1, 1') in the beverage discharge disposition (2), whereby said state presentation means are of at least one type including a visual and an acoustic type, and preferentially provided associated with said beverage discharge disposition (2).

Figure 12:
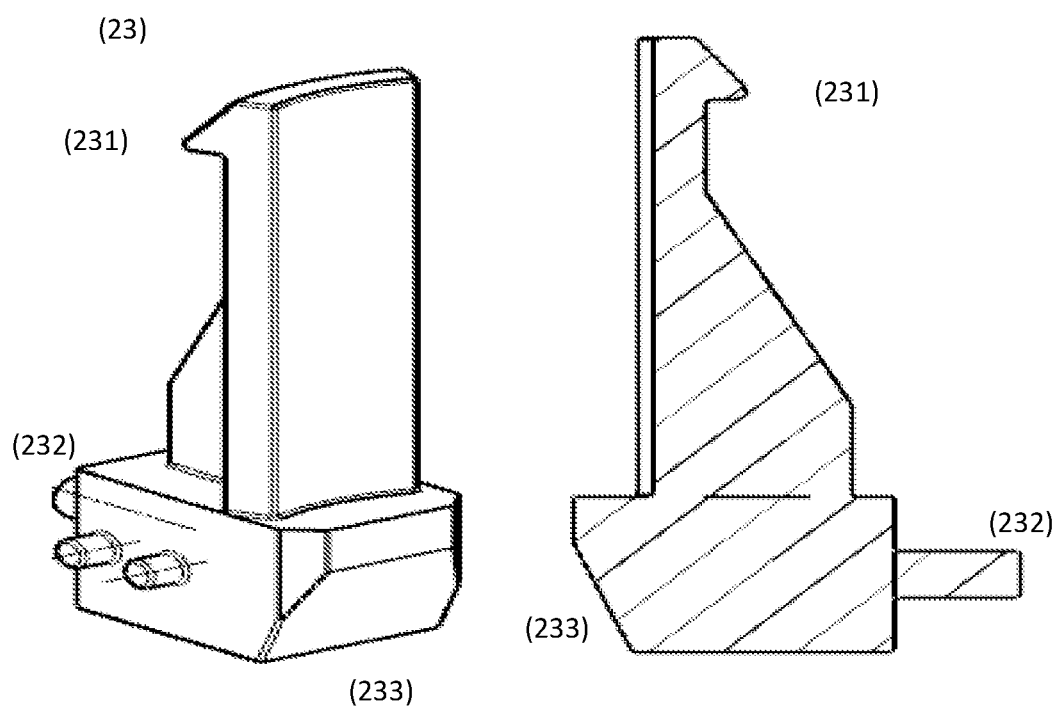
FIG. 12: posterior perspective views (on the left-hand side) and side-cut views of an engagement element (23) of an embodiment of beverage discharge disposition (2) in a beverage preparation system according to the invention.

FIG. 12 represents a preferred embodiment of said engagement elements (23).

As represented, said engagement elements (23) present a respective first actuation part (232) adapted so that can be impinged by first actuation means (251) with a force along a direction transversal relative to the prevailing beverage discharge direction, between an un-compressed position corresponding to the open position (I), and a compressed position corresponding to the retention position (II), and vice-versa.

Moreover, it is preferred when said engagement elements (23) present a respective second actuation part (233) comprising an inclined surface, oriented inwards with relation to the central region of said beverage discharge disposition (2), and adapted so that said inclined surface is impinged outwards by second actuation means (252) that move in an ascending movement, and vice-versa.

It is further preferred when said beverage discharge disposition (2) present engagement elements (23) with a total height of at most 60 mm, preferentially comprised between 20 and 60 mm, particularly preferentially between 30 and 40 mm, and in that said engagement part (231) presents a height of at most 10 mm, and the transversal hook form portion develops at least 2 mm beyond the vertical portion.

The invention claimed is:

1. A system for distribution of beverages comprising:
    at least one type of beverage recipient (1, 1') with a collection space (A) developing upwards from a base wall (11) that comprises a flow passageway opening (110);
    a flow regulation disposition (12) that provides a flow passage if impinged with at least a given flow passage pressure upstream, and an engagement portion (16); and
    at least one type of beverage apparatus (3) operatively associated with a beverage discharge disposition (2), said beverage discharge disposition (2) comprising a beverage discharge element (21) oriented to discharge the beverage upwards with said flow passage pressure, and a recipient placement surface (22) surrounding said beverage discharge element (21),
    wherein said beverage discharge disposition (2) further comprises a plurality of engagement elements (23) that can be driven between an open position (I) that enables placing said beverage recipients (1, 1') on said recipient placement surface (22), and a closed position (I) in which engage said engagement portion (16) thereby retaining said beverage recipient (1, 1') on said recipient placement surface (22), and vice-versa, between the closed position (II) and the open position (I), wherein said plurality of engagement elements (23) are disposed along an alignment that surrounds said beverage discharge element (21) and in at least approximately symmetric manner in relation thereto, wherein said plurality of engagement elements (23) are movable between said open (I) and closed position (II), and vice-versa, by actuation means (25; 251, 252) arranged in a centred and symmetric manner in relation to said beverage discharge element (21) and operative without rotation in at least one of a translational movement and a vertical movement, and wherein said engagement elements (23) are jointly driven in a radially outwards or inwards, only translational movement, without rotation in relation to said beverage discharge element (21).

2. The system according to claim 1, wherein said engagement elements (23) project upwards of said recipient placement surface (22) and below a top surface developing above and around of said recipient placement surface (22), and wherein each of said engagement elements (23) presents an engagement part (231) configured in a hook shape, inverted-"L" shape form, or similar, that projects above the recipient placement surface (22) and is adapted to engage with said engagement portion (16) of beverage recipients (1, 1'), whereby each of said engagement elements (23) further comprises first and second actuation parts (232, 233) adapted to be driven by respective actuation means (25; 251, 252) provided underneath said recipient placement surface (22).

3. The system according to claim 1, wherein said engagement elements (23) and said beverage discharge element (21) are adapted to be driven by respective actuation means (251, 252) that are operatively driven by means of a common actuation device that is arranged so that a respective direction of actuation force is at least approximately parallel to, and aligned with a central longitudinal axis of said beverage discharge element (21) along a prevailing direction of discharge flow thereof.

4. The system according to claim 1, wherein said discharge disposition (2) comprises:

first actuation means (251) provided as elastic means and disposed to move with an elastic force, radially inwards, a first actuation part (232) of each engagement element (23) towards a corresponding open position (I), and second actuation means (252) adapted to move vertically said beverage discharge element (21), so that when moving upwards they press radially outwards upon said second actuation part (232) of said retention elements (23) against the action of said first actuation means (251), so that the retention elements (23) move radially outwards and the respective engagement part (231) engages with said engagement portion (16) of the beverage recipients (1, 1') in a closed position (II), and vice-versa, between a closed position (II) and an open position (I).

5. The system according to claim 1, wherein said engagement elements (23) comprise a respective first actuation part (232) that can be impinged by first actuation means (251) with a force along a transversal direction relative to a prevailing beverage discharge direction, between an uncompressed position corresponding to the open position (I), and a compressed position corresponding to the close position (II), and vice-versa.

6. The system according to claim 5, wherein said engagement elements (23) comprise a respective second actuation part (233) comprising an inclined surface, oriented inwards with relation to the central region of said beverage discharge disposition, and adapted so that said inclined surface is moved outwards by second actuation means (252) that move in an ascending movement, and vice-versa.

7. The system according to claim 2, wherein said engagement elements (23) are provided so that only the respective engagement part (231) projects above of the recipient placement surface (22), and present a total height of at most 60 mm, and wherein said engagement part (231) presents a height of at most 10 mm, and the transversal portion of the hook shape develops at least 2 mm beyond the vertical portion.

8. The system according to claim 3, wherein said beverage discharge disposition (2) is provided so that the actuation means (25; 251, 252) include at least one of elastic means, electro mechanic means and hydraulic means.

9. The system according to claim 1, wherein said beverage recipient (1, 1') presents an engagement portion (16) that develops from said base portion (11) and is adapted so that said beverage recipient (1, 1') can be retained in said recipient placement surface (22) by means of said engagement elements (23) adapted so as to mechanically engage with said engagement portion (16) so that said flow regulation disposition (12) is retained vertically aligned above of said beverage discharge element (21).

10. The system according to claim 1, wherein said beverage recipient (1, 1') comprises an engagement portion (16) that comprises a first part (161) that develops downwards, and a second part (162) that develops along a transversal direction in relation to the centre of beverage recipient (1, 1'), whereby said first and second parts (161, 162) are configured with a shape that provides fitting engagement of engagement elements (23) associated with said beverage discharge disposition (2), in particular presenting an engagement depth (d) and an engagement height (h) bigger than 0.5 mm and smaller than 25 mm, and providing a free height (h'), that is bigger than said engagement height (h), in the interior region that they delimit above said recipient placement surface (22).

11. The system according to claim 1, wherein said beverage apparatus (3) is a beverage preparation apparatus, in particular of espresso coffee and similar beverages, and comprises, from upstream to downstream along the flow direction:

a flow pressurization device (7), adapted to supply a fluid supply (FS) at a pressure comprised between 1 and 20 bar, a brewing device (4) adapted to collect a portion (5) of edible substance, optionally provided inside of a capsule, and to supply a beverage discharge flow (BD) of resulting beverage, a beverage discharge disposition (2) adapted to provide support for placement of a plurality of types of beverage recipient (1, 1'), and discharge of said beverage discharge flow (BD) to the interior of said collection space (A), whereby said beverage preparation apparatus (3) comprises an opening (8) adapted to provide an introduction of a portion (5) of edible substance, and to be closed and supply connects to said brewing device (4), and adapted for supplying said portion (5) of edible substance, whereby said opening (8) is provided next to said beverage discharge disposition (2), in the same exterior surface of said beverage preparation apparatus (3).

12. The system according to claim 1, further comprising a plurality of types of beverage recipients (1, 1') having different dimensions, in particular at least one of different dimensions of collection space (A) and different dimensions of respective base walls (11), and adapted to be retained by means of mechanical engagement in a same type of beverage discharge disposition (2), in particular presenting an engagement portion (16) with a similar engagement height (h), whereby at least of said types of beverage recipients (1, 1') is not a disposable recipient.

13. A system for distribution of beverages comprising:

at least one type of beverage recipient (1, 1') with a collection space (A) developing upwards from a base wall (11) that comprises a flow passageway opening (110);

a flow regulation disposition (12) that provides a flow passage if impinged with at least a given flow passage pressure upstream, and an engagement portion (16); and at least one type of beverage apparatus (3) operatively associated with a beverage discharge disposition (2), said beverage discharge disposition (2) comprising a beverage discharge element (21) oriented to discharge the beverage upwards with said flow passage pressure, and a recipient placement surface (22) surrounding said beverage discharge element (21), wherein said beverage discharge disposition (2) further comprises a plurality of engagement elements (23) that can be driven between an open position (I) that enables placing said beverage recipients (1, 1') on said recipient placement surface (22), and a closed position (I) in which engage said engagement portion (16) thereby retaining said beverage recipient (1, 1') on said recipient placement surface (22), and vice-versa, between the closed position (II) and the open position (I), wherein said plurality of engagement elements (23) are disposed along an alignment that surrounds said beverage discharge element (21) and in at least approximately symmetric manner in relation thereto, wherein said plurality of engagement elements (23) are movable between said open (I) and closed position (II), and vice-versa, by actuation means (25; 251, 252) arranged in a centred and symmetric manner in relation to said beverage discharge element (21), wherein said engagement elements (23) are jointly driven in a radially outwards or inwards, only translational movement, without rotation in relation to said beverage discharge element (21), and wherein said radial translational movement is operatively associated with an ascending movement of said beverage discharge element (21) between a respective collected position and a projected position where it is adjacent to said flow regulation disposition (12), and vice-versa.

14. A system for distribution of beverages comprising:

at least one type of beverage recipient (1, 1') with a collection space (A) developing upwards from a base wall (11) that comprises a flow passageway opening (110);

a flow regulation disposition (12) that provides a flow passage if impinged with at least a given flow passage pressure upstream, and an engagement portion (16); and at least one type of beverage apparatus (3) operatively associated with a beverage discharge disposition (2), said beverage discharge disposition (2) comprising a beverage discharge element (21) oriented to discharge the beverage upwards with said flow passage pressure, and a recipient placement surface (22) surrounding said beverage discharge element (21), wherein said beverage discharge disposition (2) further comprises a plurality of engagement elements (23) that can be driven between an open position (I) that enables placing said beverage recipients (1, 1') on said recipient placement surface (22), and a closed position (I) in which engage said engagement portion (16) thereby retaining said beverage recipient (1, 1') on said recipient placement surface (22), and vice-versa, between the closed position (II) and the open position (I), wherein said plurality of engagement elements (23) are disposed along an alignment that surrounds said beverage discharge element (21) and in at least approximately symmetric manner in relation thereto, and wherein said beverage discharge disposition (2) is controlled between the open (I) and closed position (II) by means of a control device operatively associated with the beverage apparatus (3), according to at least one of:

a sensor of presence of beverage recipient (1, 1') operatively associated with said beverage discharge disposition (2), and an actuation interface of beverage apparatus (3).

15. A system for distribution of beverages comprising:

at least one type of beverage recipient (1, 1') with a collection space (A) developing upwards from a base wall (11) that comprises a flow passageway opening (110);

a flow regulation disposition (12) that provides a flow passage if impinged with at least a given flow passage pressure upstream, and an engagement portion (16); and at least one type of beverage apparatus (3) operatively associated with a beverage discharge disposition (2), said beverage discharge disposition (2) comprising a beverage discharge element (21) oriented to discharge the beverage upwards with said flow passage pressure, and a recipient placement surface (22) surrounding said beverage discharge element (21), wherein said beverage discharge disposition (2) further comprises a plurality of engagement elements (23) that can be driven between an open position (I) that enables placing said beverage recipients (1, 1') on said recipient placement surface (22), and a closed position (I) in which engage said engagement portion (16) thereby retaining said beverage recipient (1, 1') on said recipient placement surface (22), and vice-versa, between the closed position (II) and the open position (I), wherein said plurality of engagement elements (23) are disposed along an alignment that surrounds said beverage discharge element (21) and in at least approximately symmetric manner in relation thereto, and wherein said beverage recipient (1, 1') further comprises a flux constrain disposition (13) associated with said passage passageway opening (110) downstream of said flow regulation disposition (12), and configured to change at least one of prevailing flow direction and flow passage section along the flux constrain disposition (13), so that the flow pattern at the entry in the base region of the collection space (A) is different from the flow pattern directly downstream of said flow regulation disposition (12).

\* \* \* \* \*